(12) United States Patent
Filgas et al.

(10) Patent No.: US 9,762,018 B2
(45) Date of Patent: Sep. 12, 2017

(54) SYSTEM AND METHOD FOR COOLING A LASER GAIN MEDIUM USING AN ULTRA-THIN LIQUID THERMAL OPTICAL INTERFACE

(71) Applicant: Raytheon Company, Waltham, MA (US)

(72) Inventors: David M. Filgas, Newbury Park, CA (US); Christopher R. Koontz, Manhattan Beach, CA (US)

(73) Assignee: Raytheon Company, Waltham, MA (US)

( * ) Notice: Subject to any disclaimer, the term of this patent is extended or adjusted under 35 U.S.C. 154(b) by 0 days.

(21) Appl. No.: 14/661,828

(22) Filed: Mar. 18, 2015

(65) Prior Publication Data

US 2016/0164241 A1    Jun. 9, 2016

Related U.S. Application Data

(60) Provisional application No. 62/089,530, filed on Dec. 9, 2014.

(51) Int. Cl.
*H01S 3/042* (2006.01)
*H01S 3/04* (2006.01)
*H01S 3/16* (2006.01)

(52) U.S. Cl.
CPC ............ *H01S 3/042* (2013.01); *H01S 3/0407* (2013.01); *H01S 3/1643* (2013.01)

(58) Field of Classification Search
CPC .. H01S 3/0407; H01S 5/02423; H01S 5/0243; H01S 3/042
See application file for complete search history.

(56) References Cited

U.S. PATENT DOCUMENTS

| | | | |
|---|---|---|---|
| 5,105,430 A | 4/1992 | Mundinger et al. | |
| 5,363,391 A | 11/1994 | Matthews et al. | |
| 6,690,696 B2* | 2/2004 | Byren | H01S 3/04 372/34 |
| 6,810,060 B2 | 10/2004 | Vetrovec | |
| 6,859,472 B2 | 2/2005 | Betin et al. | |
| 6,937,629 B2 | 8/2005 | Perry et al. | |
| 9,014,226 B2* | 4/2015 | Perin | H01S 3/042 372/35 |
| 2002/0110166 A1 | 8/2002 | Filgas | |

(Continued)

FOREIGN PATENT DOCUMENTS

WO    WO 01/61799    8/2001

OTHER PUBLICATIONS

International Search Report and Written Opinion issued for PCT/US2015/055014 dated Feb. 5, 2016, 10 pgs.

*Primary Examiner* — Tod T Van Roy (57) ABSTRACT

A heat sink for cooling a laser gain medium includes a coolant channel, an inlet pore, an outlet pore, and a thermal optical interface (TOI) channel. The coolant channel is configured to receive a coolant for removing heat from the heat sink. The TOI channel is coupled to the coolant channel by the inlet pore and the outlet pore. The TOI channel is configured to receive a portion of the coolant through the inlet pore. The received portion forms an ultra-thin liquid TOI. The TOI channel is further configured to return a portion of the TOI through the outlet pore to the coolant channel.

20 Claims, 3 Drawing Sheets

(56) References Cited

U.S. PATENT DOCUMENTS

| | | |
|---|---|---|
| 2003/0086454 A1* | 5/2003 | Nagano .............. H01S 5/02423 |
| | | 372/35 |
| 2004/0028094 A1* | 2/2004 | Betin ..................... H01S 3/042 |
| | | 372/35 |
| 2005/0058173 A1* | 3/2005 | Vetrovec ................ H01S 3/025 |
| | | 372/66 |
| 2006/0108098 A1 | 5/2006 | Stevanovic et al. |
| 2008/0069160 A1 | 3/2008 | Stephens, IV |
| 2008/0095204 A1* | 4/2008 | Miyajima .............. H01S 5/024 |
| | | 372/35 |
| 2012/0103569 A1 | 5/2012 | Kim |

* cited by examiner

SYSTEM AND METHOD FOR COOLING A LASER GAIN MEDIUM USING AN ULTRA-THIN LIQUID THERMAL OPTICAL INTERFACE

CROSS-REFERENCE TO RELATED APPLICATION AND PRIORITY CLAIM

This application claims priority under 35 U.S.C. §119(e) to U.S. Provisional Patent Application Ser. No. 62/089,530 filed on Dec. 9, 2014, which is hereby incorporated by reference in its entirety.

TECHNICAL FIELD

The present disclosure is directed, in general, to high power, solid-state laser gain amplifiers and, more specifically, to a system and method for cooling a laser gain medium using an ultra-thin liquid thermal optical interface.

BACKGROUND

High power, solid-state laser gain amplifiers can require high performance cooling to dissipate waste heat fluxes over 100 W/cm$^2$, while maintaining a low temperature rise between a laser gain medium and a coolant. Typically, this high performance cooling is achieved by flowing coolant directly over the gain medium or by attaching to the gain medium a heat sink with internal passages for flowing coolant. However, direct liquid cooling generally requires very high coolant flow rates and pressure drops to cool large heat fluxes. In addition, heat sinks are fabricated from high thermal conductivity materials that may not be well-matched in coefficient of thermal expansion (CTE) to the laser gain medium, which can result in major performance issues, or from CTE-matched material, which is difficult to fabricate microchannel geometry and apply uniformly over large surface areas and results in poorer thermal performance than non-CTE-matched heat sinks. Finally, the use of a liquid metal or a solid material as a thermal interface between the gain medium and a non-CTE-matched heat sink has been considered. However, most of such liquid metals are toxic and/or corrosive, and solid materials have a relatively low thermal conductance, convert fluorescent energy into additional waste heat at the gain medium interface, provide unacceptable uniformity across the gain medium, and can generate stress due to CTE mismatch with the gain medium.

SUMMARY

This disclosure provides a system and method for cooling a laser gain medium using an ultra-thin liquid thermal optical interface (TOI).

In one embodiment, a heat sink for cooling a laser gain medium includes a coolant channel, an inlet pore, an outlet pore, and a thermal optical interface (TOI) channel. The coolant channel is configured to receive a coolant for removing heat from the heat sink. The TOI channel is coupled to the coolant channel by the inlet pore and the outlet pore. The TOI channel is configured to receive a portion of the coolant through the inlet pore. The received portion forms an ultra-thin liquid TOI. The TOI channel is further configured to return a portion of the TOI through the outlet pore to the coolant channel.

In another embodiment, a system for cooling includes a heat sink, a TOI channel, and a laser gain medium. The heat sink includes an inlet pore, an outlet pore, and a coolant channel that is configured to receive a coolant for removing heat from the heat sink. The TOT channel is coupled to the coolant channel by the inlet pore and the outlet pore. The TOI channel is configured to receive a portion of the coolant through the inlet pore. The received portion forms an ultra-thin liquid TOI. The TOI channel is further configured to return a portion of the TOT through the outlet pore to the coolant channel. The laser gain medium is configured to generate heat energy and fluorescent energy. The TOT is configured to conduct the heat energy to the heat sink. The TOT includes an optically transparent liquid such that the fluorescent energy is passed through the TOI to the heat sink.

In yet another embodiment, a method for cooling a laser gain medium includes providing a coolant to a coolant channel of a heat sink. The coolant is allowed to leak through an inlet pore into a TOI channel to form an ultra-thin liquid TOI. The TOT is allowed to leak through an outlet pore back into the coolant channel.

Other technical features may be readily apparent to one skilled in the art from the following figures, descriptions, and claims.

BRIEF DESCRIPTION OF THE DRAWINGS

For a more complete understanding of the present disclosure, reference is now made to the following description taken in conjunction with the accompanying drawings, in which.

DETAILED DESCRIPTION

FIGS. 1 through 6, discussed below, and the various embodiments used to describe the principles of the present disclosure in this patent document are by way of illustration only and should not be construed in any way to limit the scope of the disclosure. Those skilled in the art will understand that the principles of the present disclosure may be implemented using any number of techniques, whether currently known or not. Additionally, the drawings are not necessarily drawn to scale.

Figure 1:
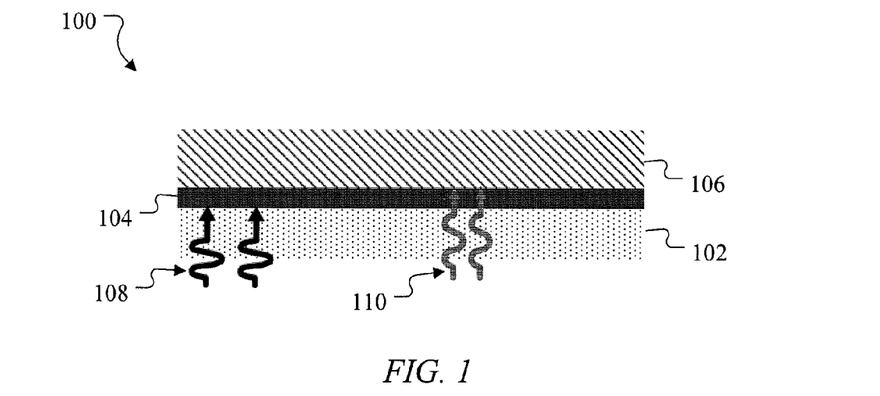
FIG. 1 illustrates a cross-sectional view of a portion of a system for cooling a laser gain medium using an ultra-thin liquid thermal optical interface (TOI) in accordance with an embodiment of the present disclosure.

FIG. 1 illustrates a cross-sectional view of a portion of a system 100 for cooling a laser gain medium 102 using an ultra-thin liquid thermal optical interface (TOI) 104 in accordance with an embodiment of the present disclosure. The embodiment of the system 100 shown in FIG. 1 is for illustration only. Other embodiments of the system 100 could be used without departing from the scope of this disclosure.

Conventional high-power, solid-state laser gain amplifiers generally use high performance cooling to dissipate waste heat fluxes greater than 100 W/cm$^2$, while maintaining a low temperature rise between the gain medium and a coolant. High performance cooling of a solid-state laser gain amplifier can be also be achieved by flowing coolant directly over the gain medium or by attaching to the gain medium a heat sink with internal passages for flowing coolant. Direct liquid cooling can be applied over large surface areas, but very high coolant flow rates and pressure drops are typically required to cool heat fluxes greater than 100 W/cm$^2$ with a temperature difference of less than 10° C. between the surface of the gain medium and the coolant.

In the case of cooling with a heat sink, heat sinks capable of dissipating the required heat flux with only a small temperature rise and low coolant pressure drop can be fabricated from high thermal conductivity materials, such as copper or diamond, but these materials may not be well matched in coefficient of thermal expansion (CTE) to the laser gain medium. A CTE mismatch between the heat sink and gain medium creates major performance issues when the cooled surface area is more than a few square centimeters, when the assembly must tolerate wide temperature differences during operation or storage, or when the process for attaching the heat sink to the gain medium requires elevated temperatures. In these cases, a relatively thick, compliant thermal interface material is typically used, but such materials generally result in a large temperature rise between the gain medium and coolant. Additionally, such materials convert fluorescent energy into additional waste heat at the gain medium interface.

Using a heat sink that is CTE-matched to the gain medium enables the use of higher performance rigid bonding methods between the gain medium and heat sink, such as soldering, but such methods are very difficult to apply uniformly over large surface areas. The thermal performance of CTE-matched heat sinks is much poorer than for non-CTE-matched heat sinks, often due to the limitations with manufacturing cooling channels in CTE-matched heat sinks. The use of liquid metals as the thermal interface between the gain medium and a non-CTE-matched heat sink has also been considered, but most such materials are toxic and/or corrosive. Additionally, such materials convert fluorescent energy into additional waste heat at the gain medium interface.

In some situations, solid materials, such as graphite, adhesives, gap pads, gaskets, greases or the like, are used for the thermal interface. However, solid materials generally have a relatively low thermal conductance, convert fluorescent energy into additional waste heat at the gain medium interface, provide unacceptable uniformity across the gain medium, and can generate stress due to CTE mismatch with the gain medium. For example, some conventional systems include a graphite thermal interface clamped between the laser gain medium and the heat sink. This typically requires compression of about 200 psi, which can create deformation of the gain medium. In addition, a graphite thermal interface may be unable to function efficiently with heat fluxes of greater than 150 W/cm$^2$.

For the embodiment illustrated in FIG. 1, the system 100 for cooling the laser gain medium 102 includes a heat sink 106 that may be configured to provide the ultra-thin liquid TOT 104. For some embodiments, the laser gain medium 102 may include Nd:YAG, Yb:YAG or other suitable material configured to amplify a laser signal. The laser gain medium 102 may generate power of up to hundreds of W/cm$^2$. This power may include sensible heat energy 108, along with a substantial amount of fluorescent energy 110. The heat sink 106 may be a micro-channel-cooled heat sink. In addition, the heat sink 106 may be fabricated from a high thermal conductivity material, such as copper, diamond, aluminum, copper tungsten, copper molybdenum, silicon carbide or the like.

For some embodiments, the laser gain medium 102 and/or the heat sink 106 has lithographically-patterned features that allow the laser gain medium 102 and the heat sink 106 to be mechanically clamped together with a controlled gap thickness for the liquid of the TOI 104, as described in more detail below. However, it will be understood that the laser gain medium 102 may be coupled to the heat sink 106 in any suitable manner.

The TOI 104 may include water, ethylene glycol, or other suitable fluid and may be optically transparent to the pump and laser wavelengths and scattered pump and signal light emitted from the laser gain medium 102. Thus, as shown in FIG. 1, the TOI 104 may conduct the sensible heat energy 108 generated by the laser gain medium 102 to the heat sink 106 (as opposed to using convection or phase change on the heat energy 108 from the laser gain medium 102), while the fluorescent energy 110 may pass through the TOI 104 to the heat sink 106, where that energy 110 may be absorbed directly by the heat sink 106. This embodiment prevents the fluorescent energy 110 from heating the TOT 104, thereby reducing the temperature differential between the laser gain medium 102 and the TOI 104 as compared to a system that includes a liquid metal TOI.

The TOT 104 includes an ultra-thin layer of fluid between the laser gain medium 102 and the heat sink 106. For example, for a particular embodiment, the TOI 104 may be about 1-10 μm thick. Having such a micro-thickness for the TOT 104 provides a very low thermal resistance, which creates a relatively high conductance interface. This allows the heat energy 108 to be conducted through the TOT 104, as described above. For a particular example, as compared to conventional TOIs having a conductance of about 5 W/cm$^2$-C, a 2-μm thin film water TOI 104 may have a conductance of about 30 W/cm$^2$-C.

By having a liquid TOI 104 in contact with the laser gain medium 102, high uniformity can be achieved, allowing the cooling method provided by the system 100 to be easily scaled to accommodate a laser gain medium 102 with a relatively large surface area. In addition, a CTE-matched heat sink 106 is not needed because the heat sink 106 does not have to be bonded to the laser gain medium 102. Furthermore, a micro-channel-cooled heat sink 106 fabricated from a high thermal conductivity material, along with the ultra-thin TOI 104 enables the system 100 to provide very high cooling performance with modest coolant pressure drops. Therefore, by providing an optically transparent, ultra-thin liquid TOI 104 as a thermal interface to a high performance heat sink 106, the system 100 may be implemented as a high performance cooling system for planar waveguide lasers and may support scaling the power of a single planar waveguide to Megawatt (MW) average power levels.

Although FIG. 1 illustrates one example of a system 100 for cooling a laser gain medium 102, various changes may be made to the embodiment shown in FIG. 1. For example, the makeup and arrangement of the system 100 are for illustration only. Components could be added, omitted, combined, subdivided, or placed in any other suitable configuration according to particular needs.

Figure 2A:
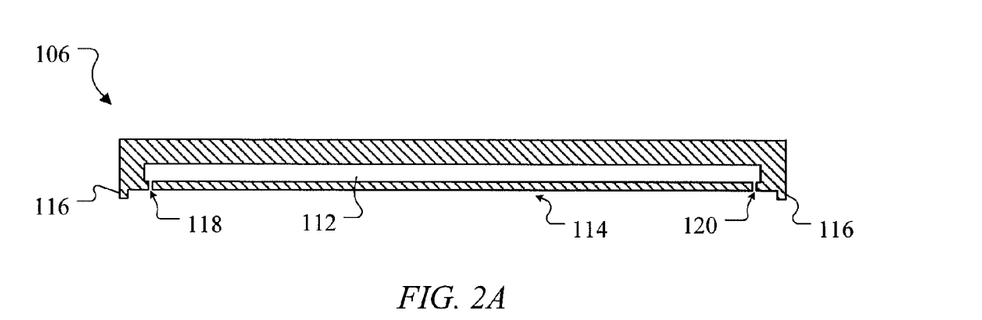
FIG. 2A illustrates a cross-sectional view of the heat sink of FIG. 1 in accordance with an embodiment of the present disclosure.

FIG. 2A illustrates a cross-sectional view of the heat sink 106 in accordance with an embodiment of the present disclosure. The embodiment of the heat sink 106 shown in FIG. 2A is for illustration only. Other embodiments of the heat sink 106 could be used without departing from the scope of this disclosure.

For the illustrated embodiment, the heat sink 106, which is fabricated from a high thermal conductivity material, such as copper, diamond or the like, includes a coolant channel 112 through which a coolant (not shown in FIG. 2A) may flow. The coolant may include water, ethylene glycol or the like. The heat sink 106 also includes supply and return ports (not shown) to allow a continuous stream of the coolant to flow through the heat sink 106 and remove heat from the system 100.

In addition, the heat sink 106 includes a TOI channel 114 through which the TOI 104 (not shown) may flow. The TOI channel 114 is formed by shims 116, which form edges that define the TOI channel 114. The heat sink 106 may also include additional shims (not shown) distributed substantially evenly across the surface of the heat sink 106 to provide additional support for a consistent gap thickness. For some embodiments, these additional shims may be cylindrical in shape. The heat sink 106 also includes at least one inlet pore 118 and at least one outlet pore 120. However, the heat sink 106 may include any suitable number of inlet pores 118 and outlet pores 120. For some embodiments, the shims 116 (and, thus, the TOI channel 114) and the pores 118 and 120 may be lithographically-patterned into the heat sink 106. As they define the TOI channel 114, the shims 116 have a height corresponding to the desired thickness of the TOI 104. Thus, for some embodiments, the shims 116 may have a height between about 1 and about 10 μm.

The liquid that makes up the TOI 104, which is the same liquid as a coolant flowing through the heat sink 106, is provided with a supply and return (i.e., the pores 118 and 120) having a sufficient flow rate to remove any bubbles trapped between the laser gain medium 102 and the heat sink 106. The inlet pore 118 is configured to allow the coolant flowing through the coolant channel 112 to leak into the TOI channel 114 where the coolant forms the ultra-thin liquid TOI 104. The outlet pore 120 is configured to allow the TOI 104 to leak out of the TOI channel 114 and back into the coolant channel 112. A natural pressure differential causes the coolant to leak into the TOI channel 114 and the TOI 104 to leak out of the TOI channel 114.

The TOI 104 is quasi-static in that its flow rate is very slow; however, the flow rate is not zero. The flow rate of the coolant through the coolant channel 112 is extremely fast as compared to the flow rate of the TOI 104 through the TOT channel 114. For a particular example, the flow rate of the coolant may be about 10 gallons/min., while the flow rate of the TOI 104 may be about 0.5 ml/min. Thus, for this example, less than 1% of the coolant is supplied through the inlet pore 118 to the TOI channel 104. The flow rate through the TOI channel 114 may be controlled by, among other factors, the number and size of the pores 118 and 120. Also, although not shown in FIG. 2A, it will be understood that a fluid seal is provided around the perimeter of the heat sink 106 to prevent the TOI 104 from leaking out of the TOI channel 114 other than through the outlet pore 120.

Although FIG. 2A illustrates one example of a heat sink 106 for cooling a laser gain medium 102, various changes may be made to the embodiment shown in FIG. 2A. For example, the makeup and arrangement of the heat sink 106 are for illustration only. Components could be added, omitted, combined, subdivided, or placed in any other suitable configuration according to particular needs.

Figure 2B:
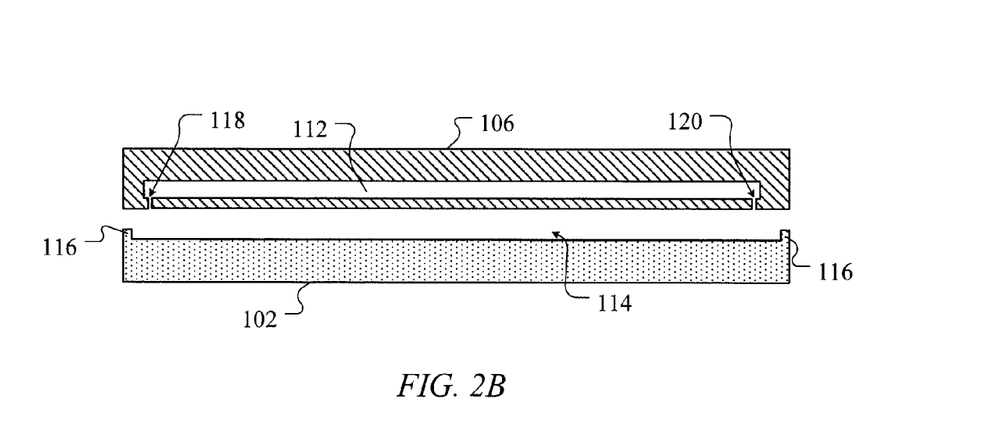
FIG. 2B illustrates a cross-sectional view of the laser gain medium and heat sink of FIG. 1 in accordance with another embodiment of the present disclosure.

FIG. 2B illustrates a cross-sectional view of the laser gain medium 102 and the heat sink 106 in accordance with another embodiment of the present disclosure. The embodiments of the laser gain medium 102 and the heat sink 106 shown in FIG. 2B are for illustration only. Other embodiments of the laser gain medium 102 and the heat sink 106 could be used without departing from the scope of this disclosure.

For the embodiment illustrated in FIG. 2B, the TOI channel 114 is formed in the laser gain medium 102 instead of in the heat sink 106. Thus, the laser gain medium 102 may be lithographically-patterned to form the shims 116 that define the TOI channel 114. The heat sink 106 may still include the inlet and outlet pores 118 and 120. For this embodiment, when the heat sink 106 is coupled to the laser gain medium 102, the pores 118 and 120 couple the coolant channel 112 of the heat sink 106 to the TOI channel 114 of the laser gain medium 102. Cooling of the laser gain medium 102 in this embodiment is provided in the same manner as described above with reference to FIG. 2A.

Although FIG. 2B illustrates one example of a laser gain medium 102 and heat sink 106, various changes may be made to the embodiment shown in FIG. 2B. For example, the makeup and arrangement of the laser gain medium 102 and the heat sink 106 are for illustration only. Components could be added, omitted, combined, subdivided, or placed in any other suitable configuration according to particular needs. For a particular example, the TOI channel 114 may be included partially in the laser gain medium 102, as shown in FIG. 2B, and partially in the heat sink 106 as shown in FIG. 2A.

Figure 3:
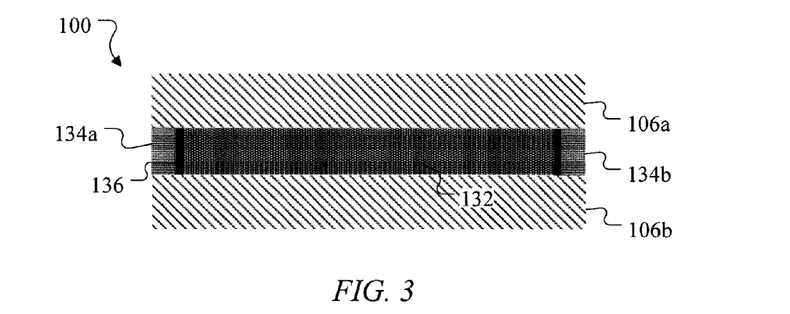
FIG. 3 illustrates a front view of the system of FIG. 1 in accordance with an embodiment of the present disclosure.
Figure 4:
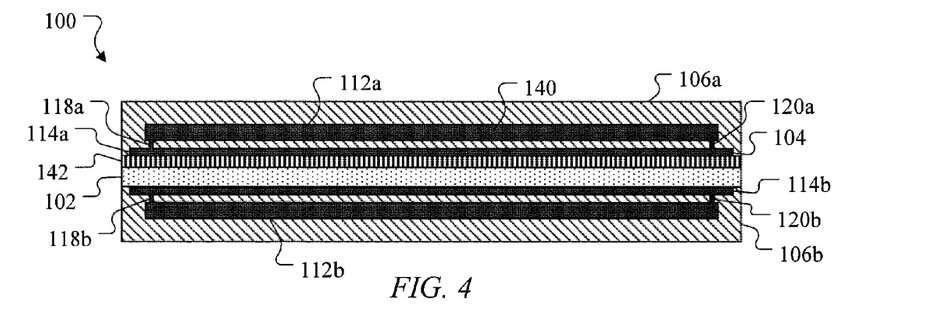
FIG. 4 illustrates a cross-sectional side view of the system of FIG. 3 in accordance with an embodiment of the present disclosure.
Figure 5:
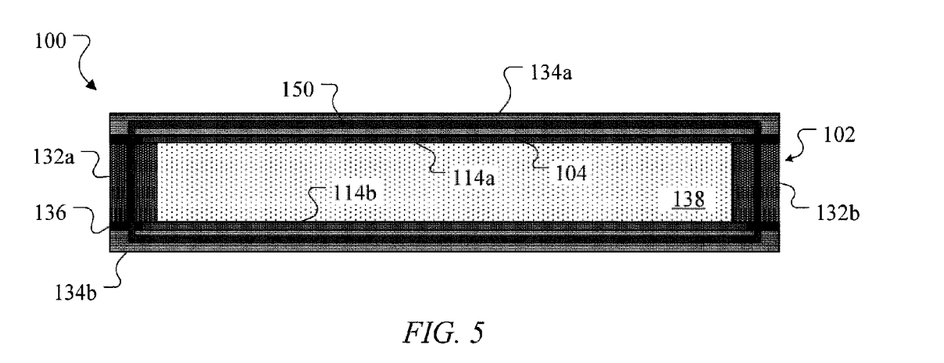
FIG. 5 illustrates a cross-sectional top view of the system of FIGS. 3 and 4 in accordance with an embodiment of the present disclosure.

FIGS. 3 through 5, below, provide various views of the system 100 in accordance with an embodiment of the present disclosure. These views are illustrated and described based on the heat sink 106 of FIG. 2A. However, it will be understood that a corresponding system 100 could be implemented using the alternate configuration of the laser gain medium 102 and the heat sink 106 illustrated in FIG. 2B, as well as any other suitable configurations of the laser gain medium 102 and/or the heat sink 106.

FIG. 3 illustrates a front view of the system 100 in accordance with an embodiment of the present disclosure. The embodiment of the system 100 shown in FIG. 3 is for illustration only. Other embodiments of the system 100 could be used without departing from the scope of this disclosure.

The illustrated system 100 includes the heat sink 106, which in this embodiment includes an upper heat sink 106a and a lower heat sink 106b. The upper and lower heat sinks 106a and 106b are mirror images of each other. The heat sink 106 is coupled to the laser gain medium 102, which includes a heat-dissipating portion (not shown in FIG. 3) and a non-heat dissipating portion 132, as described in more detail below in connection with FIG. 5. The system 100 also includes side rails 134a and 134b. As described in more detail in connection with FIG. 5, the side rails 134a and 134b are coupled along at least a portion of the length of the laser gain medium 102 by a coupling medium 136, such as an adhesive, solder, silicate bonding, oxide bonding or the like.

Although FIG. 3 illustrates one example of a front view of the system 100, various changes may be made to the embodiment shown in FIG. 3. For example, the makeup and arrangement of the system 100 are for illustration only.

Components could be added, omitted, combined, subdivided, or placed in any other suitable configuration according to particular needs.

FIG. 4 illustrates a cross-sectional side view of the system 100 in accordance with an embodiment of the present disclosure. The embodiment of the system 100 shown in FIG. 4 is for illustration only. Other embodiments of the system 100 could be used without departing from the scope of this disclosure. The view shown in FIG. 4 illustrates an inner section of the system 100, not the entire length of the system 100, as shown in FIG. 5.

The illustrated system 100 includes the laser gain medium 102 and the upper and lower heat sinks 106a and 106b. During operation, for the upper heat sink 106a, for example, the coolant channel 112a of the heat sink 106a includes coolant 140, which leaks from the coolant channel 112a through the inlet pore 118a into the TOI channel 114a and forms the TOI 104. The TOI 104 leaks from the TOI channel 114a through the outlet pore 120a back into the coolant channel 112a. Thus, the TOT 104 is continuously refreshed.

The system 100 of FIG. 4 also includes an optional stiffener 142 (not shown in connection with FIG. 3). The stiffener 142, which is configured to provide structural support to the system 100, may include copper tungsten, copper molybdenum or the like or may include an optically transparent material such as YAG or the like. For embodiments in which the stiffener 142 is implemented, the material of the stiffener 142 may be CTE-matched to the laser gain medium 102. Also, an additional TOI, formed from an adhesive or other suitable TOI, may be included between the laser gain medium 102 and the stiffener 142 (not shown in FIG. 4).

Although FIG. 4 illustrates one example of a side view of the system 100, various changes may be made to the embodiment shown in FIG. 4. For example, the makeup and arrangement of the system 100 are for illustration only. Components could be added, omitted, combined, subdivided, or placed in any other suitable configuration according to particular needs.

FIG. 5 illustrates a cross-sectional top view of the system 100 in accordance with an embodiment of the present disclosure. The embodiment of the system 100 shown in FIG. 5 is for illustration only. Other embodiments of the system 100 could be used without departing from the scope of this disclosure.

For the illustrated embodiment, the laser gain medium 102 includes the heat-dissipating portion 138 and the non-heat-dissipating portion 132a and 132b. Although illustrated separately, these portions 138 and 132a-b may form a single, continuous laser gain medium 102 with differing properties (i.e., heat-dissipating or non-heat-dissipating) based on the location of each portion 138 and 132a-b within the system 100. For a particular example, the laser gain medium 102 may have a top surface area of about 20-30 cm long by about 3 cm wide.

The illustrated system 100 also includes a side rail 134a or 134b on each side of the laser gain medium 102. The side rails 134a and 134b may be coupled to the non-heat-dissipating portions 132a and 132b of the laser gain medium 102 by a coupling medium 136, such as adhesive, solder or the like. Each side rail 134a and 134b is also coupled to a corresponding TOI channel 114a and 114b, which is in turn coupled to the heat-dissipating portion 138 of the laser gain medium 102.

The system 100 also includes a seal 150, such as an O-ring, silicate bond or adhesive, that is configured to hermetically seal the system 100 to prevent the TOI 104 from exiting the TOI channel 114 in a location other than the outlet pore 120. The seal 150 is included along the length of the side rails 134a and 134b, as well as through the non-heat-dissipating portions 132a and 132b of the laser gain medium 102 and the coupling media 136. Thus, the side rails 134a and 134b are configured to prevent the seal 150 from contacting the heat-dissipating portion 138 of the laser gain medium 102.

Although FIG. 5 illustrates one example of a top view of the system 100, various changes may be made to the embodiment shown in FIG. 5. For example, the makeup and arrangement of the system 100 are for illustration only. Components could be added, omitted, combined, subdivided, or placed in any other suitable configuration according to particular needs.

Figure 6:
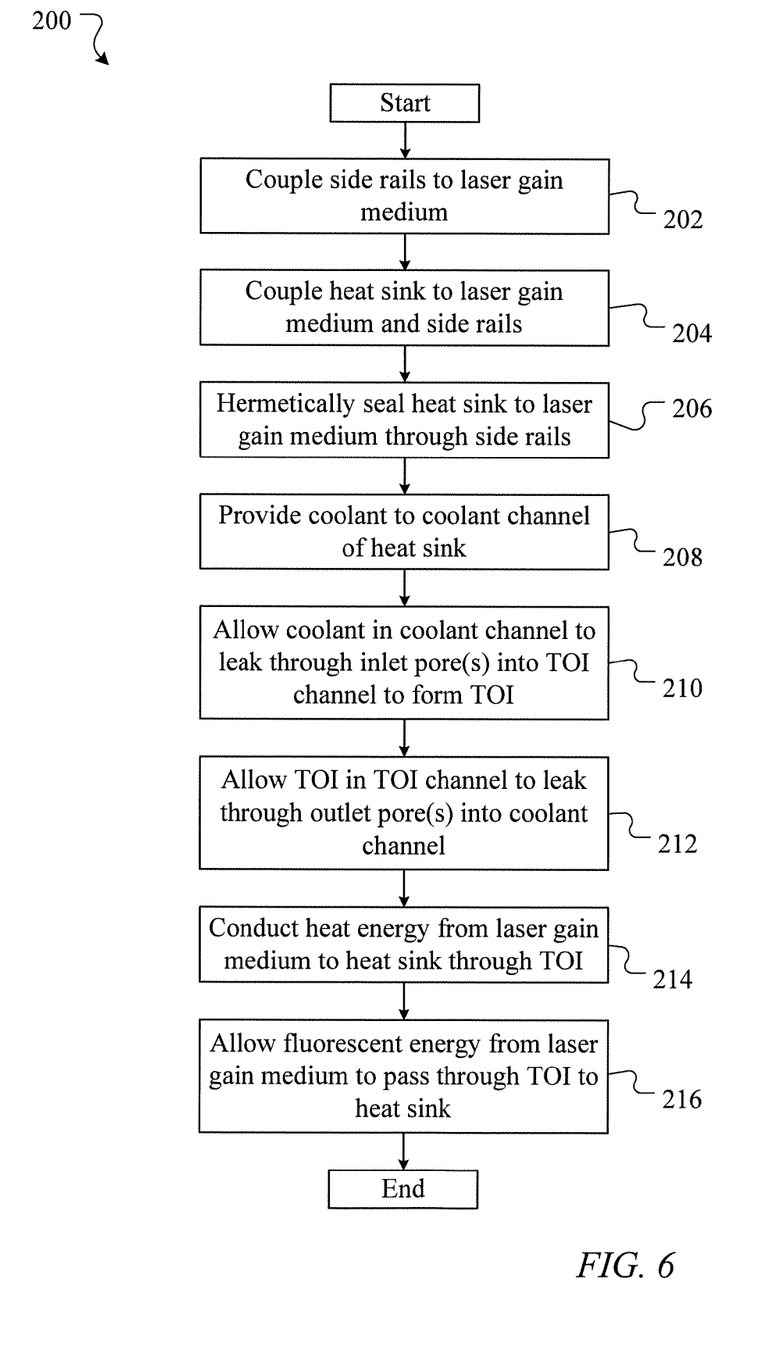
FIG. 6 is a flowchart illustrating a method for cooling a laser gain medium using an ultra-thin liquid TOI in accordance with an embodiment of the present disclosure.

FIG. 6 is a flowchart illustrating a method 200 for cooling a laser gain medium 102 using an ultra-thin liquid TOI 104 in accordance with an embodiment of the present disclosure. The method 200 shown in FIG. 6 is for illustration only. Cooling the laser gain medium 102 using the TOI 104 may be performed in any other suitable manner without departing from the scope of this disclosure.

Initially, side rails 134 are coupled to a laser gain medium 102 (step 202). As a particular example, in some embodiments, a side rail 134a or 134b may be coupled to each side of a laser gain medium 102 that includes a heat-dissipating portion 138 and a non-heat-dissipating portion 132a and 132b. The side rails 134a and 134b may be coupled to the non-heat dissipating portion 132a and 132b through coupling media 136 and to the heat-dissipating portion 138 through the TOI channels 114a and 114b. A heat sink 106 is coupled to the laser gain medium 102 and the side rails 134 (step 204). As a particular example, in some embodiments, an upper heat sink 106a and a lower heat sink 106b may be mechanically clamped to the laser gain medium 102 and side rails 134a and 134b. For some embodiments, a stiffener 142 may be coupled between the upper heat sink 106a and the laser gain medium 102.

The heat sink 106 is hermetically sealed to the laser gain medium 102 through the side rails 134 (step 206). As a particular example, in some embodiments, the upper heat sink 106a and the lower heat sink 106b are hermetically sealed to the non-heat-dissipating portion 132a and 132b of the laser gain medium 102, while the seal 150 along the length of the heat-dissipating portion 138 of the laser gain medium 102 is provided through the side rails 134a and 134b instead of directly through that portion 138 of the laser gain medium 102.

Coolant 140 is provided to a coolant channel 112 of the heat sink 106 (step 208). As a particular example, in some embodiments, the coolant 140 is introduced into the coolant channel 112 through a supply, where the coolant 140 may flow through the heat sink 106 and then remove heat by exiting the heat sink 106 through a return. For some embodiments, the coolant 140 may include water, ethylene glycol or other fluid that is optically transparent to fluorescent energy 110.

The coolant 140 in the coolant channel 112 is allowed to leak through one or more inlet pores 118 into a TOI channel 114 to form the ultra-thin liquid TOI 104 (step 210). As a particular example, in some embodiments, the TOI channel 114 may be about 1-10 µm thick, resulting in an ultra-thin TOI 104 that provides a very low thermal resistance and, thus, a relatively high conductance interface. The TOI 104 is allowed to leak through one or more outlet pores 120 back into the coolant channel 112 (step 212). Together with the inlet pores 118, the outlet pores 120 allow the TOI 104 to be slowly refreshed, resulting in a quasi-static liquid TOI 104.

Heat energy 108 is conducted from the laser gain medium 102 to the heat sink 106 through the TOI 104 (step 214). Because of the relatively high conductance interface of the TOI 104, the TOI 104 can conduct the heat energy 108 to the heat sink 106 relatively efficiently. However, fluorescent energy 110 emitted from the laser gain medium 102 is allowed to pass through the TOI 104 to the heat sink 106 (step 216).

In this way, the fluorescent energy 110 from the laser gain medium 102 does not create hot spots on the laser gain medium 102, which can create performance issues, and the temperature rise from the laser gain medium 102 to the heat sink 106 is significantly reduced as compared to a system having a solid TOI or other TOI that is not optically transparent to the fluorescent energy 110. Furthermore, because the TOI 104 is liquid, contact between the TOI 104 and the laser gain medium 102 is uniform even across a large surface area. Finally, the system 100 may be implemented as a high performance cooling system for planar waveguide lasers and may support scaling the power of a single planar waveguide to MW average power levels by implementing the optically transparent, ultra-thin liquid TOI 104 as a thermal interface to the high performance heat sink 106.

Although FIG. 6 illustrates one example of a method 200 for cooling a laser gain medium 102 using an ultra-thin liquid TOI 104, various changes may be made to the embodiment shown in FIG. 6. For example, while shown as a series of steps, various steps in FIG. 6 could overlap, occur in parallel, occur in a different order, or occur multiple times.

Modifications, additions, or omissions may be made to the apparatuses and methods described here without departing from the scope of the disclosure. For example, the components of the apparatuses may be integrated or separated. The methods may include more, fewer, or other steps. Additionally, as described above, steps may be performed in any suitable order.

It may be advantageous to set forth definitions of certain words and phrases used throughout this patent document. The term "couple" and its derivatives refer to any direct or indirect communication between two or more elements, whether or not those elements are in physical contact with one another. The terms "include" and "comprise," as well as derivatives thereof, mean inclusion without limitation. The term "or" is inclusive, meaning and/or. The term "each" refers to each member of a set or each member of a subset of a set. Terms such as "over" and "under" may refer to relative positions in the figures and do not denote required orientations during manufacturing or use. Terms such as "higher" and "lower" denote relative values and are not meant to imply specific values or ranges of values. The phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like.

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:

1. A heat sink for cooling a laser gain medium, the heat sink comprising:
    a coolant channel configured to receive a coolant for removing heat from the heat sink;
    an inlet pore;
    an outlet pore; and
    a thermal optical interface (TOI) channel coupled to the coolant channel by the inlet pore and the outlet pore, wherein:
        the TOI channel is configured to receive a portion of the coolant through the inlet pore,
        the received portion forms an ultra-thin liquid TOI,
        the TOI channel is further configured to return at least a portion of the TOI through the outlet pore to the coolant channel,
        the inlet pore and the outlet pore are sized such that a flow rate of the TOI through the TOT channel is less than one percent of a flow rate of the coolant through the coolant channel such that heat energy transfer through the TOI is primarily conductive heat energy transfer from the laser gain medium to the heat sink and not convective heat energy transfer; and
        the TOI channel is disposed between a surface of the heat sink and a surface of the laser gain medium such that the surface of the heat sink and the surface of the laser gain medium form substantially parallel walls of the TOI channel.

2. The heat sink of claim 1, wherein the heat sink does not contact the laser gain medium between the inlet pore and the outlet pore.

3. The heat sink of claim 1, wherein the coolant and the TOI comprise an optically transparent liquid.

4. The heat sink of claim 1, wherein the TOI channel comprises a thickness of about 1-10 μm.

5. The heat sink of claim 1, wherein the inlet pore comprises a plurality of input pores and the outlet pore comprises a plurality of output pores.

6. The heat sink of claim 1, wherein the heat sink further comprises a plurality of lithographically-patterned shims that are configured to define the TOI channel.

7. A system for cooling, the system comprising:
    a heat sink comprising an inlet pore, an outlet pore, and a coolant channel configured to receive a coolant for removing heat from the heat sink;
    a thermal optical interface (TOI) channel coupled to the coolant channel by the inlet pore and the outlet pore, wherein the TOI channel is configured to receive a portion of the coolant through the inlet pore, wherein the received portion forms an ultra-thin liquid TOI, wherein the TOI channel is further configured to return at least a portion of the TOI through the outlet pore to the coolant channel, and wherein the inlet pore and the outlet pore are sized such that a flow rate of the TOI through the TOI channel is less than one percent of a flow rate of the coolant through the coolant channel; and
    a laser gain medium configured to generate heat energy and fluorescent energy, wherein the flow rate of the TOI through the TOI channel is such that transfer of the heat energy through the TOI is primarily conductive heat energy transfer from the laser gain medium to the heat sink and not convective heat energy transfer, and wherein the TOI comprises an optically transparent liquid such that the fluorescent energy is passed through the TOI to the heat sink;

wherein the TOI channel is disposed between a surface of the heat sink and a surface of the laser gain medium such that the surface of the heat sink and the surface of the laser gain medium form substantially parallel walls of the TOI channel.

8. The system of claim 7, wherein the TOI channel is formed in the heat sink.

9. The system of claim 7, wherein the TOI channel is formed in the laser gain medium.

10. The system of claim 7, wherein the TOI channel comprises a thickness of about 1-10 µm.

11. The system of claim 7, wherein the laser gain medium comprises a heat-dissipating portion and a non-heat-dissipating portion, and wherein the heat sink comprises an upper heat sink and a lower heat sink.

12. The system of claim 11, further comprising:
a first side rail coupled to a first side of the non-heat-dissipating portion of the laser gain medium; and
a second side rail coupled to a second side of the non-heat-dissipating portion of the laser gain medium.

13. The system of claim 12, further comprising a seal configured to hermetically seal the upper heat sink and the lower heat sink to the laser gain medium through the non-heat-dissipating portion of the laser gain medium and the first and second side rails.

14. A method for cooling a laser gain medium, the method comprising:
providing a coolant to a coolant channel of a heat sink;
allowing a portion of the coolant to pass through an inlet pore into a thermal optical interface (TOI) channel to form an ultra-thin liquid TOI; and
allowing the TOI to pass through an outlet pore back into the coolant channel;
wherein the inlet pore and the outlet pore are sized such that a flow rate of the TOI through the TOI channel is less than one percent of a flow rate of the coolant through the coolant channel such that heat energy transfer through the TOI is primarily conductive heat energy transfer from the laser gain medium to the heat sink and not convective heat energy transfer, and
wherein the TOI channel is disposed between a surface of the heat sink and a surface of the laser gain medium such that the surface of the heat sink and the surface of the laser gain medium form substantially parallel walls of the TOI channel.

15. The method of claim 14, wherein the coolant and the TOT comprise an optically transparent liquid.

16. The method of claim 14, wherein the TOI channel comprises a thickness of about 1-10 µm.

17. The method of claim 14, further comprising:
conducting heat energy generated by the laser gain medium through the TOI to the heat sink; and
allowing fluorescent energy generated by the laser gain medium to pass through the TOI to the heat sink.

18. The method of claim 14, further comprising:
coupling a first side rail to a non-heat dissipating portion of the laser gain medium; and
coupling a second side rail to the non-heat dissipating portion of the laser gain medium.

19. The method of claim 18, wherein the heat sink comprises an upper heat sink and a lower heat sink, the method further comprising coupling the upper and lower heat sinks to the laser gain medium and the first and second side rails.

20. The method of claim 19, further comprising hermetically sealing the upper and lower heat sinks to the laser gain medium through the first and second side rails and the non-heat-dissipating portion of the laser gain medium.

* * * * *

UNITED STATES PATENT AND TRADEMARK OFFICE
CERTIFICATE OF CORRECTION

PATENT NO. : 9,762,018 B2  
APPLICATION NO. : 14/661828  
DATED : September 12, 2017  
INVENTOR(S) : David M. Filgas et al.

Page 1 of 1

It is certified that error appears in the above-identified patent and that said Letters Patent is hereby corrected as shown below:

In the Specification  
Column 2, Line 2, delete "TOT" and insert --TOI--;  
Column 2, Line 7, delete "TOT" and insert --TOI--;  
Column 2, Line 9, delete "TOT" and insert --TOI--;  
Column 2, Line 11, delete "TOT" and insert --TOI--;  
Column 2, Line 17, delete "TOT" and insert --TOI--;  
Column 3, Line 66, delete "TOT" and insert --TOI--;  
Column 4, Line 30, delete "TOT" and insert --TOI--;  
Column 4, Line 34, delete "TOT" and insert --TOI--;  
Column 4, Line 38, delete "TOT" and insert --TOI--;  
Column 4, Line 40, delete "TOT" and insert --TOI--;  
Column 5, Line 52, delete "TOT" and insert --TOI--; and  
Column 7, Line 20, delete "TOT" and insert --TOI--.

In the Claims  
Column 10, Claim 1, Line 18, delete "TOT" and insert --TOI--; and  
Column 12, Claim 15, Line 12, delete "TOT" and insert --TOI--.

Signed and Sealed this  
Thirteenth Day of April, 2021

Drew Hirshfeld  
*Performing the Functions and Duties of the*  
*Under Secretary of Commerce for Intellectual Property and*  
*Director of the United States Patent and Trademark Office*